Sept. 10, 1963  H. W. BOTELER  3,103,342
DIAPHRAGM VALVE
Filed Nov. 17, 1960  7 Sheets-Sheet 1

INVENTOR.
HENRY W. BOTELER
BY David W. McKenney
ATTORNEY

Sept. 10, 1963 H. W. BOTELER 3,103,342
DIAPHRAGM VALVE

Filed Nov. 17, 1960 7 Sheets-Sheet 2

*INVENTOR.*
HENRY W. BOTELER
BY
ATTORNEY

Sept. 10, 1963    H. W. BOTELER    3,103,342
DIAPHRAGM VALVE
Filed Nov. 17, 1960    7 Sheets-Sheet 4

*INVENTOR.*
HENRY W. BOTELER
BY
ATTORNEY

Sept. 10, 1963  H. W. BOTELER  3,103,342
DIAPHRAGM VALVE
Filed Nov. 17, 1960  7 Sheets-Sheet 5

*INVENTOR.*
HENRY W. BOTELER
BY David M. Kenney
ATTORNEY

Sept. 10, 1963 H. W. BOTELER 3,103,342
DIAPHRAGM VALVE
Filed Nov. 17, 1960 7 Sheets-Sheet 6

INVENTOR.
HENRY W. BOTELER
BY
ATTORNEY

Sept. 10, 1963   H. W. BOTELER   3,103,342
DIAPHRAGM VALVE
Filed Nov. 17, 1960   7 Sheets-Sheet 7

INVENTOR.
HENRY W. BOTELER
ATTORNEY

3,103,342
DIAPHRAGM VALVE
Henry W. Boteler, East Greenwich, R.I., assignor to Grinnell Corporation, Providence, R.I., a corporation of Delaware
Filed Nov. 17, 1960, Ser. No. 69,918
6 Claims. (Cl. 251—331)

This application relates to improvements in diaphragm valves. More particularly it has to do with diaphragm valves of the kind which have diaphragms with deeply bulged central portions.

In general a diaphragm valve has a body with a flow passageway therethrough which communicates with a diaphragm opening on the side of the body between the ends thereof. A flexible diaphragm has its margin clamped to the rim of this opening by a bonnet containing an actuating mechanism which moves the central portion of the diaphragm into the flow passageway to block the same and close the valve.

There are several arrangements in the diaphragm valve art for seating the diaphragm against the surface of the body to obtain a fluid tight closure. Perhaps the best known involves a high weir which is in the nature of a web integral with the body and extending from the interior surface thereof opposite the opening a substantial distance toward said opening. The surface of this web presented to the opening provides the diaphragm seat and is in the form of a concaved band with ends blending smoothly with the surface of a flange which is around the opening and to which the diaphragm margin is clamped. The diaphragm is molded with its central portion slightly convexed or concaved and when pressed toward the weir fits nicely thereagainst.

In these high-weir valves the passageway openings at the ends of the body are conventionally circular, and as the passageway approaches the weir from each of these ends its shape becomes oval but with a cross-sectional area not materially less than the cross-sectional area of the circular openings. The proportions of the diaphragm opening, the weir and diaphragm concavity are such that when the diaphragm is held in open position the cross-sectional area of the oval-shaped space between the weir and the diaphragm is again not materially less than the cross-sectional area of the circular openings. In this manner no undue restriction to flow is produced.

In this above-described high-weir valve construction substantially half of the cross-sectional area of the oval-shaped space between the weir and the diaphragm in open position is above the level of the diaphragm opening in the body and results from the concavity of the diaphragm in this position. This portion of the cross-sectional area is relied upon to prevent flow restriction.

A relatively recent prior art improvement in this type of valve which has gone into widespread use has substantially eliminated the weir by providing a diaphragm in which the central portion is in the form of a very deep bulge capable of extending from the diaphragm opening at the top of the passageway all the way to the level of the bottom of the circular end openings. In addition the passageway in this prior art improvement is substantially cylindrical from one end of the valve to the other, and a part of the cylindrical surface at the bottom of the passageway opposite the opening is employed as a seating portion for the hemispherical end of the diaphragm cone. Above this seating portion it is necessary to provide some slope or taper in the substantially straight sides of the bulge and a similar slope or taper on the body side walls (which extend to the diaphragm opening) to obtain a tight seal when the diaphragm is pressed against the body to close the valve. The greater the slope or taper (angle between the sides of the bulge) the better the seal, but also the larger the diaphragm opening which is a disadvantage because the pressure of the fluid in the valve acting over the area of this opening produces a force which opposes the closing of the valve. When this force is large the actuating mechanism must be made very strong, and in the case of hand operation considerable strength or a large mechanical advantage is required.

In compromising between large diaphragm bulge taper for good sealing and a small diaphragm opening in the body for easy operation a highly satisfactory design has been reached in the prior art, and these valves have enjoyed considerable popularity since their introduction.

Although the prior art no-weir valve above referred to has had a seating with tapered side walls leading from the diaphragm opening substantially tangent to the cylindrical passageway, a part of which forms the portion of the seating most remote from the diaphragm opening, there have been even more recent proposals in which this remote part of the seating has a configuration different than the arc of the passageway cylinder. For example, this remote seating part may be a flat floor substantially parallel to the plane of the diaphragm opening with small radii where it joins the tapered side walls. Or this remote seating part may follow some curve other than the arc of the cylinder, with this curve blending smoothly into the side walls.

However, all such arrangements have a common feature which makes them particularly attractive, namely, a seating which at its location most remote from the diaphragm opening is a substantial distance therefrom and which has steep side walls leading to the diaphragm opening. This arrangement provides the least abrupt change in direction of flow. I have observed, however, that in the prior art no-weir valves and the most recent proposals referred to, unlike the high weir valves, the cross-sectional area at the seating is not merely about the same as the cross-sectional area at the ends of the valve but rather is much greater. The reason for this is that in the prior art no-weir valve the elimination of the weir and the taper in the sides of the seating provides a cross-sectional area below the diaphragm opening which is more than equal to the cross-sectional area of the passageway at the ends thereof, so that the additional cross-sectional area which is above the diaphragm opening and which results from the flexible sides of the central diaphragm bulge bowing upwardly provides a total cross-sectional area at the seating much greater than the cross-sectional area of the passageway ends.

Since the cross-sectional area of the opening at the seating in the prior are no-weir valves is thus so much greater than is required to prevent restriction to flow it would seem that a diaphragm and seating combination of the same type but proportionally smaller could be used to obtain an opening at the seating which is substantially equal to the cross-sectional area of the passageway at the ends of the valve. The difficulty with this, however, is that although there would be an adequate cross-sectional area at the seating, the passageway between the ends of the valve and the diaphragm opening would have a cross-sectional area which was becoming progressively less toward the diaphragm opening and which was less than the cross-sectional area at the ends of the valve.

The present invention has to do with my discovery that for a valve with a passageway end opening of a given size a diaphragm and seating combination of the no-weir type but proportionally smaller than those heretofore proposed can be very successfully employed if the passageway between the end openings and the seating (or the diaphragm opening, as the case may be) is enlarged in a particular way to compensate for the restriction in cross-sectional area in this part of the passageway which would otherwise occur.

More particularly, this enlargement comprises curving certain walls of the passageway outwardly from a straight line drawn from the edge of the end opening to the seating (or to the diaphragm opening, as the case may be) so that these walls curve first outwardly and then inwardly again and form what are herein called recesses.

For the purpose of this invention valves of the no-weir type may be defined as those in which a sphere which is inserted through the diaphragm opening in the body and which is large enough to engage both the straight, steeply sloping sides of the seating below this opening has by far its greater portion below the plane of the surface around diaphragm opening to which the diaphragm margin is clamped.

The advantage of a valve in accordance with this invention is that the diaphragm opening which determines the effective area against which the line pressure acts to resist valve closure can be substantially reduced in comparison to the no-weir valves of the same size heretofore proposed and at the same time the pressure drop through the valve when the valve is in open position can be kept surprisingly low.

One of the advantages of the recent prior art improvements previously described is the substantially straight configuration of the bottom (when the body is oriented in space with the diaphragm opening presented upwardly) of the flow passageway from one end of the valve to the other. This enables complete draining of any horizontal pipe line section in which such a valve is located and is a desirable feature. By far the most preferred embodiment of the present invention achieves this same straight configuration of the bottom of the flow passageway through the valve by having the diaphragm opening set far enough down below the top level of the passageway openings at the ends of the body for the end of the central diaphragm portion to reach to the bottom level of the passageway openings at the ends of the body. The top level of the passageway then slopes downward from the ends of the body to the lowered level of the diaphragm opening, and the pockets of this invention are preferably formed at the sides of the passageway although they may be formed at the top of the passageway or at both the sides and top.

Another embodiment of this invention involves the location of the diaphragm opening at the top level of the passageway openings at the ends of the body. Here again the opening is relatively smaller than in the recent prior art improvements with the result that in closed position the diaphragm does not extend to the bottom level of the passageway openings at the ends of the body. Accordingly, from the ends of the body the bottom level of the passageway sweeps up to the seating at the center of the body.

If it is desired to make this slope very gentle, beginning at the passageway end openings, a restriction to flow will result like that caused by the downwardly sloping top level of the passageway in the first-mentioned embodiment. In such cases recesses at the sides or at the top of the passageway between the diaphragm opening and the passageway ends would substantially compensate for this restriction. On the other hand, if it is satisfactory to make this slope somewhat more abrupt and have it begin closer to the seat the compensation for restriction will be in the form of bottom recesses between the diaphragm opening and the passageway ends. In addition various combinations of these constructions are possible with side, bottom and top recesses.

Accordingly it is an object of the present invention to provide an improved diaphragm valve which is efficient in operation and inexpensive to manufacture.

Another object of the invention is to provide an improved diaphragm valve of the type having a diaphragm with a deeply bulged central portion which, in valve closed position, extends into the body from the diaphragm opening therein a distance substantially less than the diameter of the flow passageway at the ends of the valve, wherein certain walls of the passageway between the end opening thereof and the seating or diaphragm opening curve outwardly from a straight line drawn from the edge of the end opening to the seating or to the diaphragm opening and thereby form smooth recesses in the passageway walls.

Another object of the invention is to provide an improved diaphragm valve of the type described in which the recesses are so located that a cross section of the passageway taken parallel to the plane of one end opening and taken between such end opening and the seating shows a cross-sectional passageway area having at least one portion outside the perpendicular projection of such end opening on the plane of such cross section.

Another object of the invention is to provide an improved diaphragm valve of the type described in which the diaphragm opening in the body is set substantially below the top level of the flow passageway at the ends of the valve.

Another object of the invention is to provide an improved diaphragm valve of the type described in which the diaphragm opening is set substantially below this top level of the flow passageway, in which the central portion of the diaphragm extends to the bottom level of the passageway at the ends of the valve and in which the bottom surface of the passageway forms a substantially straight line from one end of the valve to the other.

Another object of the invention is to provide an improved diaphragm valve of the type described in which the diaphragm opening is located at the top level of the flow passageway at the ends of the valve.

Another object of the present invention is to provide an improved diaphragm valve of the type described in which the cross-sectional area portions outside the projection are at the sides of the passageway, or at the bottom of the passageway, or at the top of the passageway, or any combination of these.

Another object of the invention is to provide an improved diaphragm valve of the type described in which the passageway end openings are substantially circular and in which the central diaphragm portion is substantially hemispherical with a diameter substantially smaller than the diameter of the passageway end openings.

Other objects will appear hereinafter.

The best modes in which I have contemplated applying the principles of my improvements are shown in the accompanying drawings, but these are to be deemed merely illustrative for it is intended that the patent shall cover by suitable expression in the appended claims whatever of patentable novelty exists in the invention disclosed.

Figure 4:
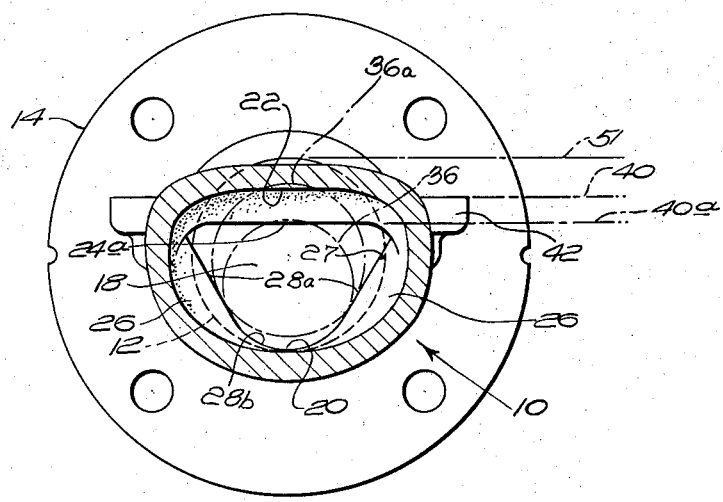
FIGURE 4 is a view taken on line 4—4 of FIG. 1.
Figure 9:
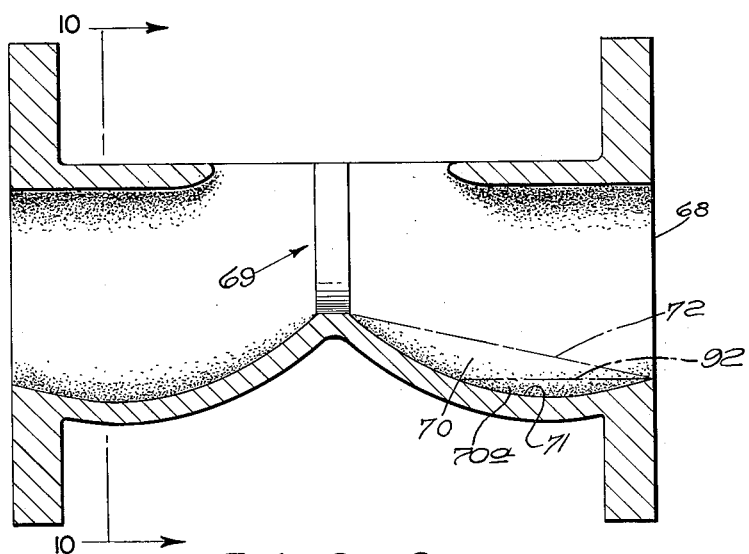
FIGURES 6, 9 and 12 are side elevation views like the body in FIG. 1 but showing three other embodiments of the invention.
Figure 6:
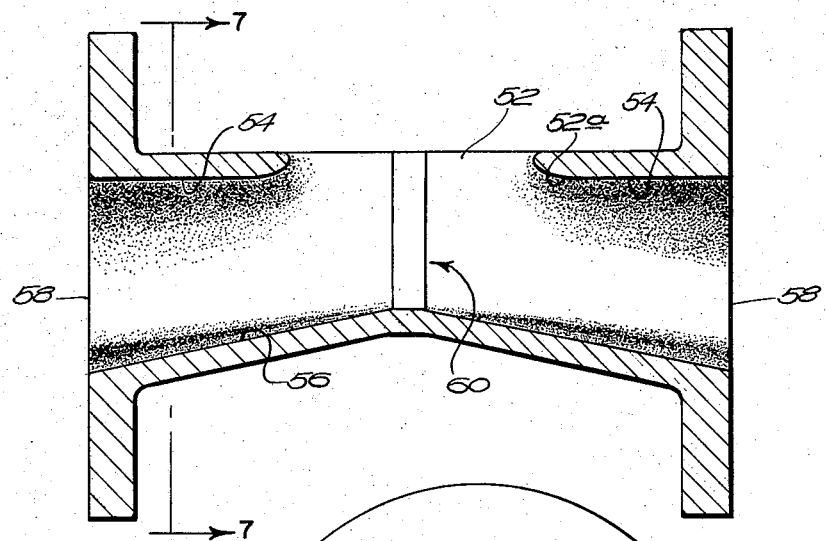
Figure 7:
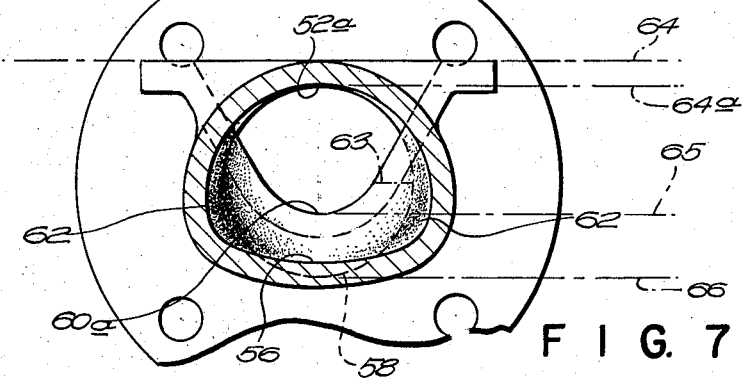
Figure 8:
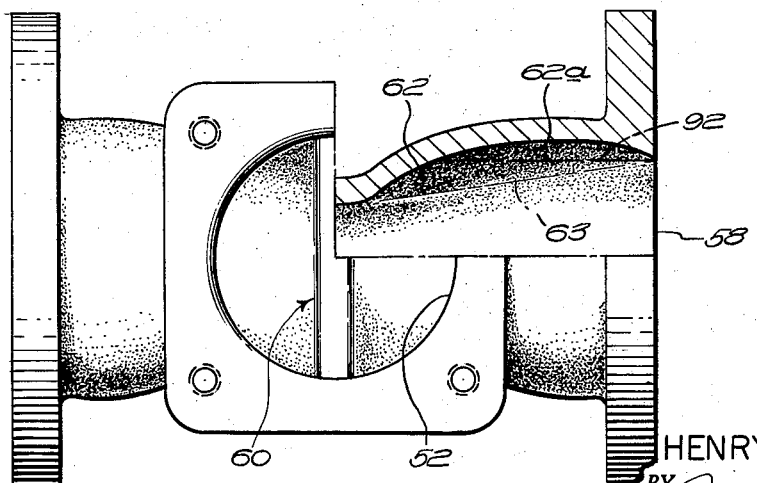
Figure 10:
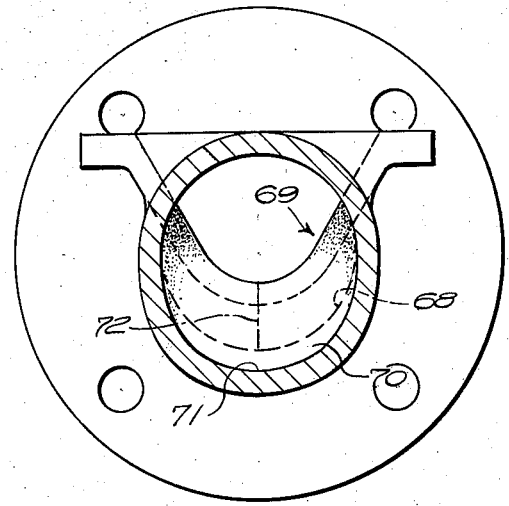
Figure 11:
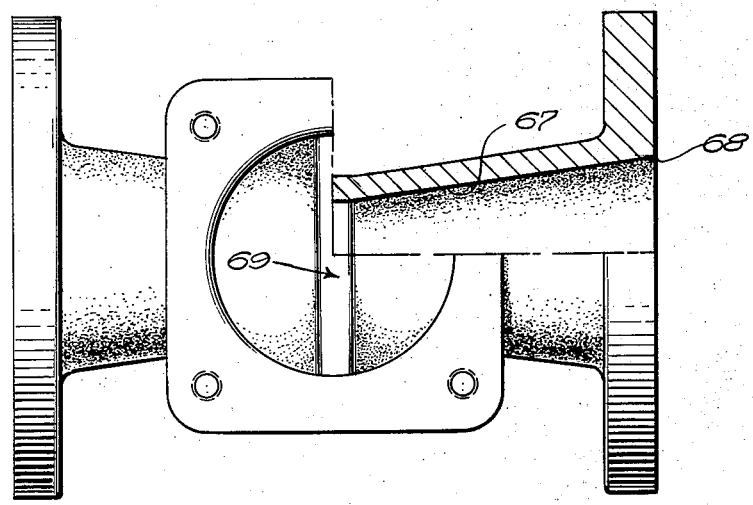
Figure 12:
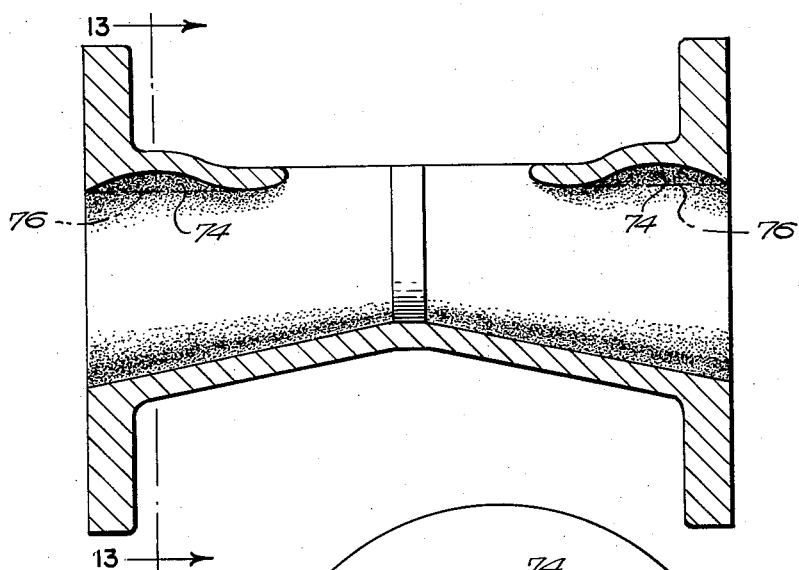
Figure 13:
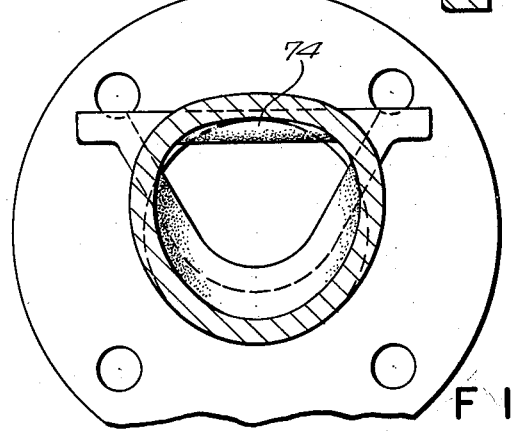
Figure 14:
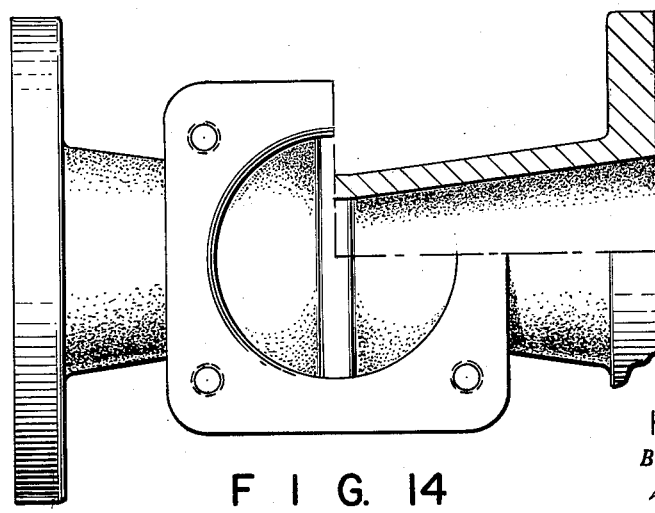
Figure 15:
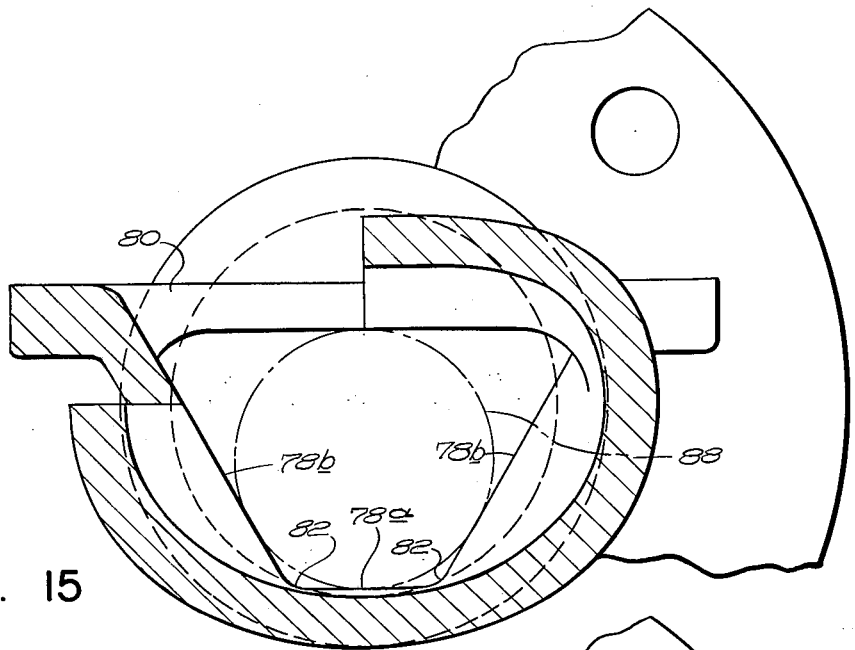
Figure 16:
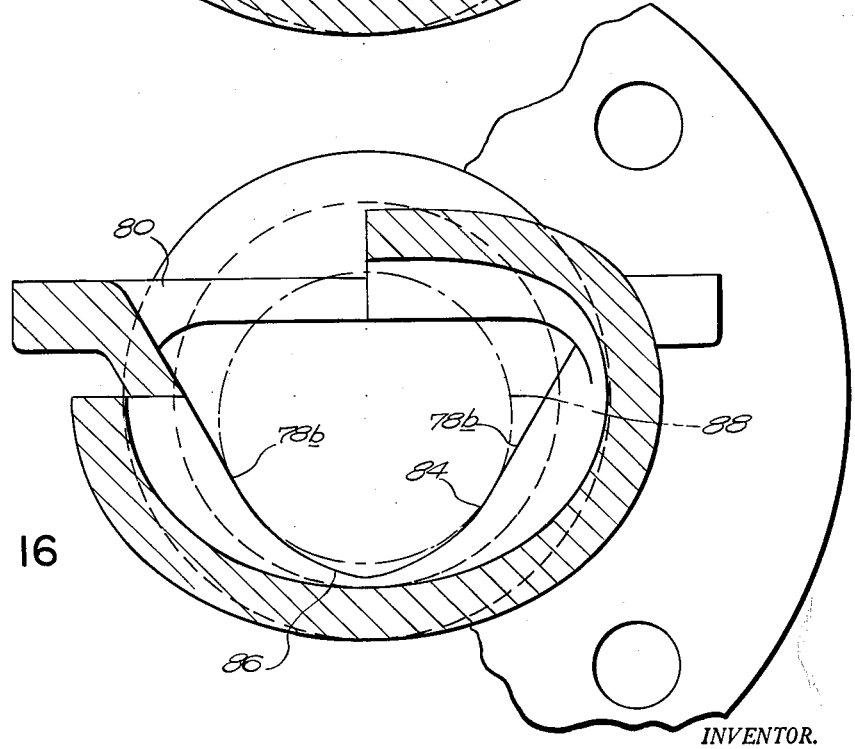

FIGURES 7, 10 and 13 are cross-section views taken on lines 7—7, 10—10 and 13—13 of FIGS. 6, 9 and 12, respectively;

FIGURES 8, 11 and 14 are top plan views, partly sectioned, of the bodies of FIGS. 6, 9 and 12, respectively;

FIGURES 15 and 16 are views like FIG. 4 but showing other shapes for the diaphragm seating.

Referring now to FIGS. 1-5 of the drawings, these show a preferred embodiment of present invention employing a valve body 10 which has a pair of substantially circular end openings 12 surrounded by flanges 14 with which the valve is secured in a pipe line 16. As shown best in FIGS. 1 and 2 a flow passageway 18 connects these openings 12, and the bottom 20 of this passageway is essentially straight from one opening 12 to the other. However, from the top of each of the openings 12 the wall 22 of the passageway slopes downwardly to the diaphragm opening 24 in the top of the body.

As best shown in FIG. 4 the shape of the openings 12 is circular but the cross-sectional shape of the flow passageway inwardly from these end openings 12 loses its circular configuration primarily by the downward sloping passageway top walls 22 and by the appearance of shallow recesses 26 (FIGS. 4 and 5) which are located in this embodiment at the sides of the passageway. The existence of these recesses as herein defined is established by the fact that a straight line 27 drawn from the edge of the opening 12 to the seating 28 along the flow passageway is spaced inwardly from the wall of the flow passageway. This is a new structural arrangement in diaphragm valves of the type with which this invention is concerned, because as far as I am aware the passageway walls in all such previously proposed diaphragm valves of this type have been defined by such straight lines as 27.

Resistance to flow in diaphragm valves is not solely a function of the amount of restriction in cross-sectional area which may appear from place to place. In other words by merely making sure that the cross-sectional area along the valve body is everywhere equal to the cross-sectional area of the openings at the ends of the body does not give the valve a resistance to flow equal to that of a straight piece of pipe. Turbulence caused by the changing shape of the flow passageway and the changing direction of the line of flow within the passageway are also very important in determining the amount of resistance to flow in the valve as a whole.

I have discovered, however, that the provision of the recesses 26 between the seating 28 (or the edges 30 of the diaphragm opening as the case may be) and the passageway ends 12 greatly improves the flow. Since the recesses 26 cannot be formed on the bottom of the passageway in the embodiment of FIGS. 1 to 5 without upsetting its straight line configuration it remains for the recesses to be located at the sides or top of the passageway, and FIGURE 4 illustrates these recesses 26 at the sides by showing that the surface of the sides of the passageway are radially outside of the line 27.

Figure 1:
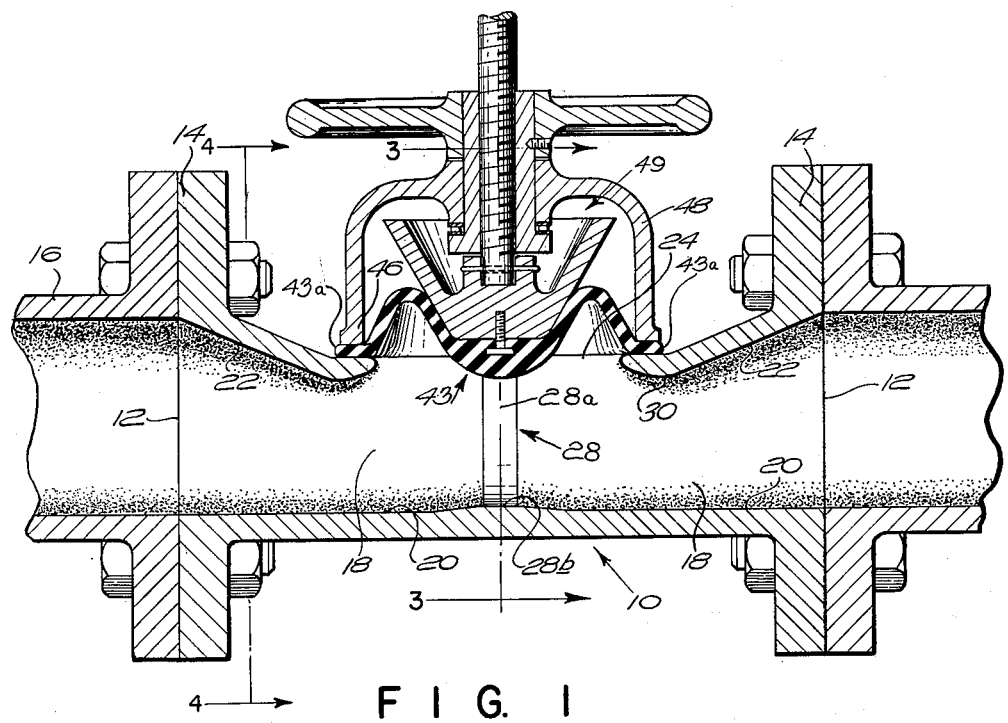
FIGURE 1 is a cross-sectioned side elevation view of one embodiment of the present invention showing the valve in open position.
Figure 2:
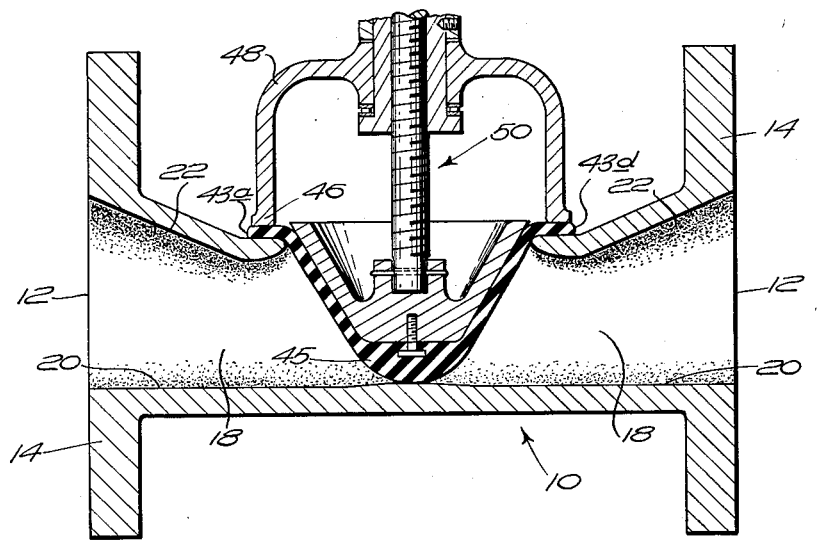
FIGURE 2 is a view like FIG. 1, but omitting parts of the actuating mechanism and showing the valve in closed position.
Figure 3:
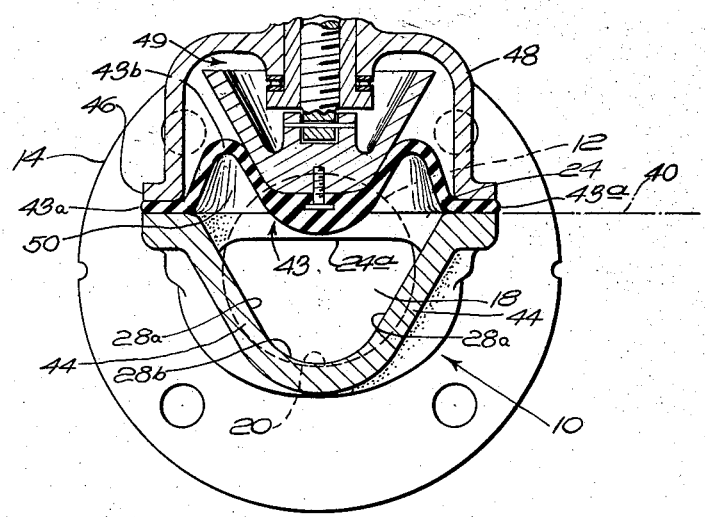
FIGURE 3 is a view taken on line 3—3 of FIG. 1.

Referring to FIG. 3, this illustrates particularly well that the diaphragm 43 employed is of the deeply-bulged type. This type may be recognized by the fact that a sphere 36 (shown by dot-dash lines in FIG. 4) inserted in the diaphragm opening 24 and large enough to engage the steeply sloped straight portions 28a of the diaphragm seating 28 lies substantially entirely on one side of the plane 40 of the flange 42 which is around the diaphragm opening 24 and to which the marginal portion 43a of the diaphragm 43 is to be clamped. In the embodiment of FIGS. 1–5 the central portion 28b of the seating is the arc of a circle to which the straight side seating portions 28a are tangent so that a sphere like 36 also engages this central seating portion 28b. A somewhat larger sphere 36a is also shown in FIG. 4 demonstrating that this embodiment is well within the proportions required for the present invention because even this larger sphere 36a is substantially entirely below the plane 40.

In accordance with the present invention the spheres 36 and 36a are smaller in diameter than the circle defining the passageway end openings 12.

As a result of the above-described structural relationships the body in FIGS. 1–5 has a pair of small side webs 44 on which the seating 28 is formed. To avoid abrupt changes in the direction of flow within the passageway the surfaces of the passageway are blended smoothly from the ends 12 into the recesses 26 and then out of these recesses to the seating 28.

As in prior art diaphragm valves having diaphragms of the deep cone-shaped type, the valve of FIGS. 1–5 has the marginal portion 43a of the diaphragm 43 clamped around the diaphragm opening 24 by the lower flanged end 46 of a bonnet 48 which houses the mechanism 49 for advancing the diaphragm toward its seat and for withdrawing the diaphragm from its seat to open the valve.

FIGURE 3 illustrates that the cross-sectional area of the flow passageway at the seating is more than equal to the cross-sectional area at the end openings 12. This is true despite the fact that the diaphragm opening 24 is proportionally smaller than in prior art no-weir valves and is due in large measure to the annular cavity 50 created by the rolled diaphragm skirt portion 43b and located above the plane 40 of the diaphragm opening.

As previously described, the diaphragm opening 24 in this embodiment of FIGS. 1–5 is set below the top level of the passageway at the ends of the body. This is made clear by the fact that a plane 51 parallel to the plane 40 and tangent to the top of the end openings 12 is spaced substantially from a plane 40a also parallel to plane 40 and including the underside 24a of the diaphragm opening.

Referring now to FIGS. 6–8 these show another embodiment of the present invention in which the underside 52a of diaphragm opening 52 is located at the top level 54 of the passageway through the valve. By locating the diaphragm opening in this manner the bottom level 56 of the passageway slopes upwardly from the ends 58 of the valve to the seating 60. If it is desired to have the slope of this bottom level as gradual as possible, as shown in FIG. 6, it remains for the recesses 62 to be located again at the sides of the passageway. As in the previous embodiment, the recesses are those areas radially outward from straight lines 63 drawn along the flow passageway from the end openings 58 to the seating 60 (see FIG. 8).

In this embodiment of FIGS. 6–8 the location of the diaphragm opening 42 and the seating 60 is more particularly defined by reference to a plane 64 which includes the diaphragm clamping surface around the diaphragm opening, another plane 64a parallel to plane 64 and including the underside 52a of the diaphragm opening, another plane 65 also parallel to plane 64 and including the part of the central seat portion 60a which is most remote from the plane 64, and still another plane 66 also parallel to plane 64 and tangent to the end openings 58 on the side of the plane 65 remote from the plane 64. In accordance with this embodiment of the invention planes 65 and 66 are spaced substantially apart. In this embodiment the recesses 62 extend well into the area under the diaphragm opening 52. This has the advantage that any restriction to flow caused by the edge of the diaphragm opening 52 passing over the flow passageway is compensated for by the portions 62 of the recesses in this region.

FIGURES 9–11 are like FIGS. 6–8 and illustrate that if it is desired to have the side walls 67 of the passageway surface as straight as possible between the end openings 68 and the seating 69, the recesses 70 can be located at the bottom 71 of the passageway. That these recesses are present is once more illustrated by the presence of the areas 70 radially outside the straight lines 72 shown in FIGS. 9 and 10.

It will be understood that the recesses need not be entirely on the sides of the passageway or entirely at the bottom of the passageway but if desired may extend to both regions.

FIGURES 12–14 show another embodiment like that of FIGS. 6–8 except that the recesses 74 (radially outside the straight lines 76) are at the top of the passageway rather than at the sides or bottom.

FIGURES 15 and 16 are views like FIG. 4 but showing that the seating portion 78a remote from the diaphragm opening 80 need not be a part of a circle as in the earlier embodiments. More particularly, in FIG. 15 the straight sloping side portions 78b of the seating extending from the sides of the diaphragm opening 80 join a remote central seating portion 78a which is essentially straight, small radii 82 being provided at the juncture with the side seating portions 78b.

In FIG. 16 the construction and numbers are similar except that from the sloping straight side portions 78b the seating begins to curve at 84 to a rounded apex 86.

In both FIG. 15 and FIG. 16 the diaphragm would have a central portion molded to fit the shape of the seating.

In each of these seating shapes the characteristic feature which is necessary for the present invention is the relatively large distance from the diaphragm opening to the most remote part of the seating compared to the size of the diaphragm opening. It is this proportion which provides large cross-sectional flow area above the diaphragm opening when the diaphragm is in open position (for example, the cavity 50 in FIG. 3). I have found that this feature is present when a sphere 36 or 36a (see FIG. 4) inserted in the diaphragm opening and large enough to engage both steeply sloped straight side seating portions 28a lies substantially entirely below the plane 40 of the clamping flange 42 which is around the diaphragm opening 24 and to which the diaphragm is clamped.

In FIGS. 15 and 16 such a sphere is indicated by the numeral 88.

Figure 5:
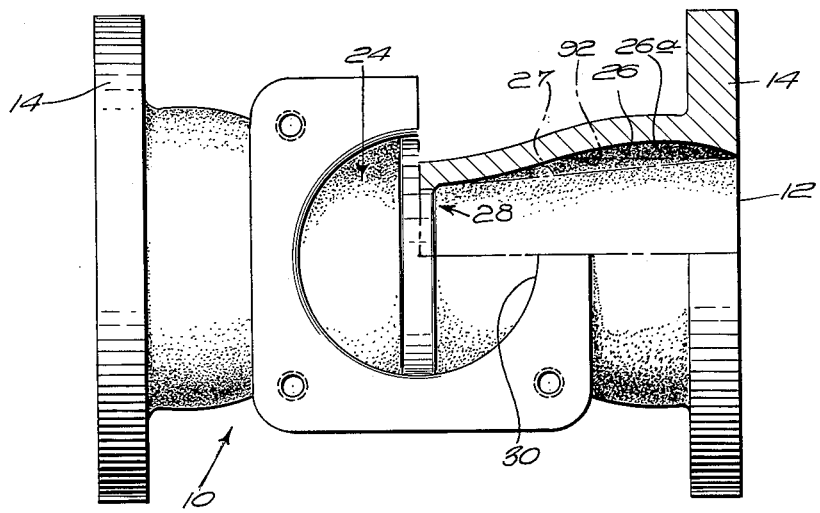
FIGURE 5 is a top plan view partly sectioned of the body shown in the embodiment of FIGS. 1-4.

Whereas the existence of recesses or pockets in the walls of the flow passageway in accordance with this invention results from the walls being curved outwardly from a straight line such as the line 27 in FIG. 5, by far the most effective recesses are those which are also radially outside an imaginary cylinder including the circular end openings and extending into the passageway. This is illustrated, for example, by the fact that in FIGS. 5, 8 and 9 there are portions 26a, 62a and 70a, respectively, of the pockets which are outside imaginary cylinders 92 perpendicular to the end openings. In FIG. 12 line 76 is already perpendicular to the plane of the end opening.

I claim:
1. A diaphragm valve comprising:
(I) a hollow rigid body having:
  (A) a pair of end openings which:
    (1) are substantially circular,
    (2) have substantially equal diameters,
  (B) a circular diaphragm opening which:
    (1) is on one side of said body,
    (2) is intermediate said end openings,
    (3) is surrounded by a flange surface in a flat plane,
  (C) an interior surface which:
    (1) extends between said openings,
    (2) forms with said openings interior edges,
  (D) a diaphragm seating band which:
    (1) is located on said body interior surface,
    (2) is located opposite said diaphragm opening,
    (3) has a central portion spaced from said flat plane by a distance less than said diameters,
    (4) has a pair of corresponding spaced-apart side portions which:
      (a) extend into said body from opposite sides of said diaphragm opening,
      (b) are substantially straight,
      (c) slope steeply inwardly,
      (d) engage a sphere which: (i) is inserted through said diaphragm opening, (ii) lies substantially entirely on the same side of said flat plane where said seating portions are located,
(II) a flexible diaphragm which:
  (A) covers said diaphragm opening,
  (B) has a central bulged portion which:
    (1) engages said seating in the closed valve position,
    (2) is bowed to the opposite side of said diaphragm opening in the open valve position,
(III) said interior body surface and said diaphragm defining a passageway which:
  (A) extends through the body between said end openings,
  (B) has a portion which:
    (1) has one end formed by the interior edge of one of said end openings,
    (2) has another end formed by the interior edge of said diaphragm opening and by the seating band,
    (3) has at least some walls which curve outwardly from straight lines which:
      (a) are drawn along said passageway portion,
      (b) are drawn between the ends of said portion,
  (C) has a cross sectional area at the seating in the open valve position which is at least as great as the cross sectional area of each of the end openings,
  (D) has each cross sectional area along the portion at least as great as the cross sectional area of each of the end openings.

2. A diaphragm valve as set forth in claim 1 in which every point on the said interior edge of said diaphragm opening is spaced substantially:
  (A) toward said central seating band portion,
  (B) from another plane which:
    (1) is tangent to the interior edges of both said end openings,
    (2) is located on the side of said end openings remote from said central seating band portion.

3. A diaphragm valve as set forth in claim 2 wherein the said interior body surface which is most remote from said other plane is substantially straight.

4. A diaphragm valve as set forth in claim 1 in which said central portion of said seating band is spaced substantially:
  (I) toward said diaphragm opening,
  (II) from another plane which:
    (A) is tangent to the said interior edges of both said end openings,
    (B) is located on the side of said end openings remote from said diaphragm opening.

5. A diaphragm valve according to claim 4, wherein the said interior body surface opposite said diaphragm opening slopes gradually from said other plane to the central seating portion.

6. A diaphragm valve as set forth in claim 1 in which:
  (I) said end openings lie in spaced apart parallel first and second planes,
  (II) the perpendicular projection of one end opening on the plane of the other end opening substantially coincides with said other end opening,
  (III) a cross section of said passageway portion taken in a third plane parallel to said first and second planes provides an area of said passageway which has at least one substantial portion outside a perpendicular projection of either of said end openings on said third plane.

References Cited in the file of this patent
UNITED STATES PATENTS
2,716,017    Linker _____ Aug. 23, 1955